(12) United States Patent
Hodgins

(10) Patent No.: US 7,134,171 B2
(45) Date of Patent: Nov. 14, 2006

(54) METHOD OF FABRICATING A SOLID-STATE ANGULAR RATE SENSOR

(75) Inventor: Diana Hodgins, Codicote (GB)

(73) Assignee: European Technology for Business Limited (GB)

(*) Notice: Subject to any disclaimer, the term of this patent is extended or adjusted under 35 U.S.C. 154(b) by 262 days.

(21) Appl. No.: 10/489,440

(22) PCT Filed: Sep. 9, 2002

(86) PCT No.: PCT/GB02/04119
§ 371 (c)(1),
(2), (4) Date: Mar. 9, 2004

(87) PCT Pub. No.: WO03/023323
PCT Pub. Date: Mar. 20, 2003

(65) Prior Publication Data
US 2004/0244183 A1 Dec. 9, 2004

(30) Foreign Application Priority Data
Sep. 12, 2001 (GB) .................................. 0121934.4

(51) Int. Cl.
*H04R 17/00* (2006.01)
*H01L 41/04* (2006.01)
(52) U.S. Cl. .................. 29/25.35; 29/594; 29/831; 29/842; 29/846; 310/369

(58) Field of Classification Search ............... 29/25.35, 29/594, 842, 846, 831; 310/319, 366, 369
See application file for complete search history.

(56) References Cited

U.S. PATENT DOCUMENTS

| 4,655,081 | A | * | 4/1987 | Burdess | 73/504.13 |
| 5,117,148 | A | * | 5/1992 | Nakamura et al. | 310/367 |
| 5,495,760 | A | * | 3/1996 | Wirt | 73/504.13 |
| 6,049,160 | A | * | 4/2000 | Safari et al. | 310/369 |

* cited by examiner

*Primary Examiner*—A. Dexter Tugbang
*Assistant Examiner*—Tai Van Nguyen
(74) *Attorney, Agent, or Firm*—Renner, Kenner, Greive, Bobak, Taylor & Weber

(57) ABSTRACT

A solid state angular rate sensor is fabricated by preparation of a disc-shaped base structure (10) having first and second outer layers of a piezo-electric ceramic material, built up from a number of layers of a ceramic sheet or film that is capable of being tape-cast. The layers are then sintered and an inner layer of metallic material is provided between the outer layers, to complete a piezo-electric base structure having an inner electrode (15) between the sintered outer layers. Arrays of electrode structures are provided on the outer layers of the base structure (10), the electrodes radiating from the central region 14 of the base structure (10) and being equi-spaced around the outer edge of the disc (19).

18 Claims, 5 Drawing Sheets

METHOD OF FABRICATING A SOLID-STATE ANGULAR RATE SENSOR

BACKGROUND OF THE INVENTION

This invention relates to solid-state angular rate sensors and manufacturing methods therefor.

A conventional form of angular rate sensor employs a gyroscope to detect the rate of angular movement to which the sensor is subjected, utilising the precession effect of a rapidly spinning flywheel. Such angular rate sensors have been provided on vehicles of all kinds, and so including aircraft and boats, to assist with the guidance of the vehicle or to enhance the safety or performance of the vehicle. For example, the sensors may be used to control active suspension systems in automobiles or other passenger-carrying vehicles, the navigational control of aircraft and ships, in global positioning systems (GPS) to maintain tracking in the event that contact with satellites is lost, roll safety protection in vehicles and, increasingly, in model aircraft to assist with the remote control thereof.

Angular rate sensors provide an output from which the angular rate of motion of the sensor can be derived, or the angular displacement of the sensor, by integrating the output. A mechanical gyroscopic angular rate sensor has limited accuracy because of a number of defects inherent in the fundamental design thereof. In particular, a gyroscope is relatively large and heavy and power must continuously be supplied to cause rotation of the flywheel in view of the friction in the flywheel bearings and air resistance. Also, the gimbal assembly used to support the flywheel and permit flywheel to turn in all directions introduces friction which reduces the accuracy of the sensor and if displacement is required, these errors accumulate over time. Further, a gyroscopic sensor is prone to drift, so reducing accuracy.

Over the last thirty years or so, there have been many proposals for solid-state devices able to detect angular rates of movement. These devices employ a resonating structure and the Coriolis forces generated by an applied angular rate affect the resonant mode of the structure. This can be detected and used to indicate the angular rate of movement of the sensor, and so to the displacement by integrating the rate signal.

In EP-0153189-A, there are described angular rate sensors in the form of both a three-dimensional cylinder and a two-dimensional disc, fabricated from a piezo-electric material, and which largely resolve the difficulties associated with the previously known solid-state devices. With both designs, the sensor is excited into the n=2 mode of vibration by a suitable drive signal applied to electrodes provided on the piezo-electric material and detecting the rate of turn by other appropriately positioned electrodes.

Angular rate sensors as described in said EP-0153189A can be made relatively small and lightweight as compared to gyroscopic devices, and need only a low drive current. Unfortunately though, these devices are expensive to manufacture and in particular must largely be trimmed by hand, in the final stages of assembly. Consequently, consistent performance is difficult to achieve.

In U.S. Pat. No. 4,655,081-A there is described a disc-shaped gyroscopic device, also fabricated from a piezoelectric material and having on one face an electrode pattern and on the other face a continuous earth electrode. The disc is significantly less stiff in the z direction as compared to the x and y (in-plane) directions and the absence of rigidity in the z direction leads to an overwhelming out-of-plane signal, which will swamp the in-plane n=2 mode.

EP-0823616-A describes a gyroscope formed from two pieces of ceramic material with an intermediate central electrode, with a patterned electrode structure on one outer surface of the device and a plane earth electrode on the other outer surface. This device is designed to operate solely in the flexural mode and is in effect a beam which bends in one plane when subjected to acceleration.

SUMMARY OF THE INVENTION

EP-0620414-A is a macro device having a number of piezo-ceramic discs stacked axially with metal washers between the ceramic discs with fields applied to the discs. Though intended to operate as a gyroscope device, it is highly complex and not suitable for use where small and simple gyroscopic devices are required.

More recently, a design based on a vibratory tuning fork has emerged for small, low-cost applications. When used as an angular rate sensor, the motion of the tuning fork out of the plane of the fork can be measured. Such designs are becoming increasingly popular since they can be fabricated from silicon or quartz, using micro-fabrication techniques. Electro-magnetic and electrostatic excitation and detection methods may be employed, but there appear to be significant performance limitations with these designs.

With the continuing miniaturisation of electronic equipment of all kinds, there is an increasing demand for smaller and simpler angular rate sensors, which are both cheaper and more robust than traditional rate sensors either of the gyroscopic kind or of the solid-state kind, but without a compromise in performance. The present invention stems from research into solid-state angular rate sensors, with this demand in mind.

According to one aspect of this invention there is provided a method of fabricating a solid state angular rate sensor, comprising:

preparing a generally circular base assembly by fabricating first and second outer layers of a piezo-electric ceramic material each built up from multiple layers of a ceramic sheet or film capable of being tape-cast and sintered, and providing between said outer layers an inner layer of a metallic material, sintering the prepared base assembly thereby to produce a piezo-electric base structure having an inner electrode between the sintered outer layers;

shaping the sintered base structure to be disc-shaped with a circular cross-section;

providing on the outer faces of the outer layers respective first and second electrode structures, each such electrode structure comprising a plurality of independent separate sectors each having a radial extent, the first and second electrode structures being of the same, configuration and arrangement and having their respective sectors in close alignment with each other; and providing means effecting connections to at least some of the sectors on the outer faces of the outer layers and to the inner electrode whereby the sectors may be separately driven with a signal which causes the disc to resonate in an in-plane mode.

This invention extends to a solid-state angular rate sensor fabricated by a method of this invention. Thus, according to a second aspect of this invention, there is provided a solid-state angular rate sensor comprising:

a sintered generally circular base structure having first and second outer layers of a ceramic piezo-electric material and a metallic conducting internal electrode disposed between the outer layers, each outer layer being assembled from multiple layers of a ceramic sheet or film capable of being tape-cast and sintered, and the whole assembly being sintered together;

first and second external electrode structures provided on the opposed outer faces of the first and second outer layers respectively of the base structure, said outer electrode structures each comprising a plurality of independent separate sectors each having a radial extent, the first and second electrode structures being of the same configuration and arrangement and having their respective sectors in close alignment with each other; and means effecting connections to at least some of the sectors on the outer faces of the outer layers and to the inner electrode, whereby the sectors may be separately driven with a signal which causes the disc to resonate in an in-plane mode.

In this specification, the term "sector" is used to mean both a true sector of a circle (that is, the shape bound by two radii of the circle and the arc extending between the radii) as well as a sector of an annulus (that is, the shape bound by two radii of an annulus and the inner and outer arcs of the annulus, which is sometimes referred to as a "block arc"). Further, the term is not intended to be interpreted in the strict mathematical sense and extends to shapes which approximate to those falling within this definition.

A solid-state sensor of this invention utilises an inert material structure which allows a maximisation of the signals generated for a given applied angular rate. By having an internal electrode, the input energy is doubled for a given drive voltage compared to a simple solid-state disc and the output is therefore also increased. Further, the size and thickness of the piezo-electric material can easily be modified to maximise the signals generated for a given applied voltage. By employing micro-fabrication techniques for the electrode structures, very small features can be produced, possibly down to less than 1 μm in size, and the electrode structure dimensions will be both accurate and reproducible. As a result, fully-automated batch fabrication techniques may be employed, so enabling the fabrication of very small, and relatively cheap angular rate sensors, having excellent accuracy in use.

The ceramic material from which the base structure is formed preferably is in the form of a sheet, film or tape which can be tape-cast and sintered, such that successive layers of the material may be overlaid to build the required thickness for each outer layer of the base structure, and also each internal layer, in the event that there is more than one internal electrode. The sintering process shrinks the base structure and due allowance must be made for this during fabrication of the base structure.

The two outer layers are assembled with the inner layer and then the assembly is sintered to form the base structure. In this case, the metallic material used to form the inner layer may be a sinterable metal which when sintered together with the outer layers forms the internal electrode.

Following sintering of the base structure, it is machined or otherwise shaped to be strictly disc-shaped with a circular cross-section, and then the end faces are prepared to a very high flatness, with both surfaces parallel. It is important that the finishing of the base structure is performed such that the inner electrode remains accurately at the mid-thickness of the base structure and parallel to the outer surfaces.

The electrode structures are produced using techniques based on conventional microfabrication processes employed widely in the integrated circuit semiconductor industry. Thus, a metallic layer is deposited on the end faces of the base structure, following which a photo-resist is applied to the deposited metal and the required electrode pattern is then photographically produced in the photo-resist. Etching of the metallic layer and removal of the remaining photo-resist completes the production of the required electrodes.

These processes must be performed to give accurate alignment between the electrode structures on each of the two outer faces of the base structure.

Respective earth electrodes may be provided on the outer faces of the base structure, to encircle the respective sectored electrode structures. Such encircling earth electrodes each having a radial extent from the periphery of the base structure. When provided, the encircling earth electrodes and said metallic inner electrode should be interconnected; this may be achieved by means of a conducting coating applied to the periphery of the base structure so interconnecting the encircling earth electrodes and the internal electrode.

To permit external connections to be made to the electrodes and also to effect interconnections between the sectored electrodes on opposed faces of the base structure, a central hole is preferably formed therethrough, concentric with the outer periphery of the structure. Suitable conducting tracks may extend over the surfaces of the base structure and also through the hole, on the wall of the base structure defining the hole. The hole may then also be used for the mounting of the base structure to a support, leaving the structure free to resonate, by carrying the support on a peg upstanding from a surface of the support. By forming conducting tracks on the support which lead to tracks on the peg corresponding to those formed through the hole, electrical connections may be made to the electrodes of the base structure by connecting to the tacks on the surface of the support.

BRIEF DESCRIPTION OF THE SEVERAL VIEWS OF THE DRAWINGS

By way of example only, the fabrication procedure for a solid-state angular rate sensor of this invention will now be described in detail, reference being made to the accompanying drawings, in which.

DETAILED DESCRIPTION OF THE INVENTION

Figure 1:
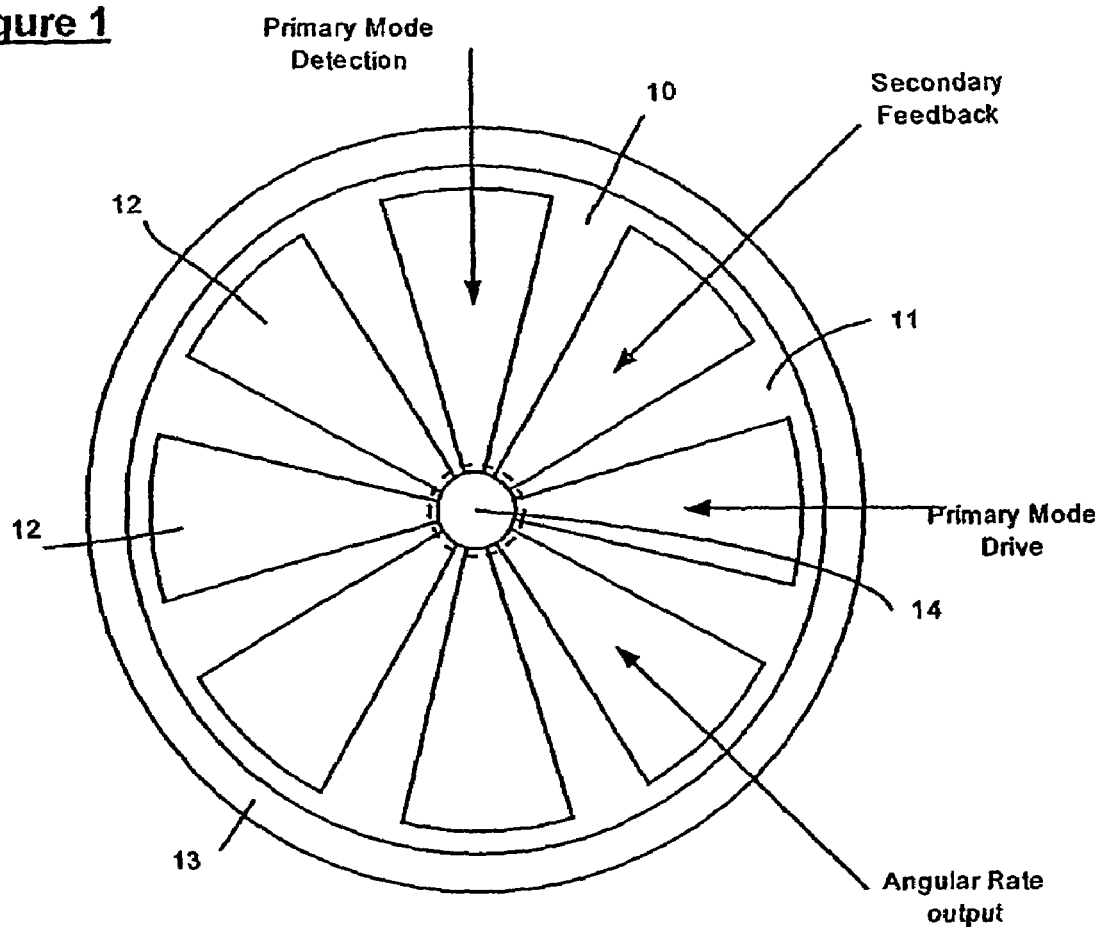
FIG. 1 is a diagrammatic plan view of one face of the sensor.

FIG. 1 is a diagrammatic plan view on an angular rate sensor of this invention. The sensor comprises a base structure 10 formed of a piezo-electric material, and carrying on its two outer faces 11 (only one of which can be seen in FIG. 1) an electrode structure made up from individual sector-shaped electrodes 12 and an encircling earth electrode 13. The base structure is disc-shaped with the earth electrode 13 extending to the disc periphery, and a central hole 14 is formed through the base structure 10. The electrode structures on the two outer faces are essentially identical and the individual electrodes on the two faces are accurately aligned with each other.

The base structure is fabricated primarily from a tape-casting piezo-electric ceramic material, and preferably from a lead zirconium titanate (PZT) based composition. The piezo-electric properties of PZT compositions can be adjusted to have a required performance within a wide range, by the controlled addition of dopant ions. Such compositions are already manufactured in tape-casting form, ready for sintering. A suitable composition for the sensor must be specified, and then multiple layers of the tape-casting composition are built up to form the first outer layer of the base structure. Typically, the outer layer will be built up to approximately 0.2 mm thick.

An electrode material is then laid on top of the tape-cast material. This may be a metallic sheet, for example of gold, or maybe a metal powder suitable for sintering. Further multiple layers of the tape-casting PZT composition are built up on top of the electrode material, to the same thickness as the first outer layer, and so using the same number of tape layers. The overall thickness of the structure then should be of the order of 0.44 mm.

Figure 2:
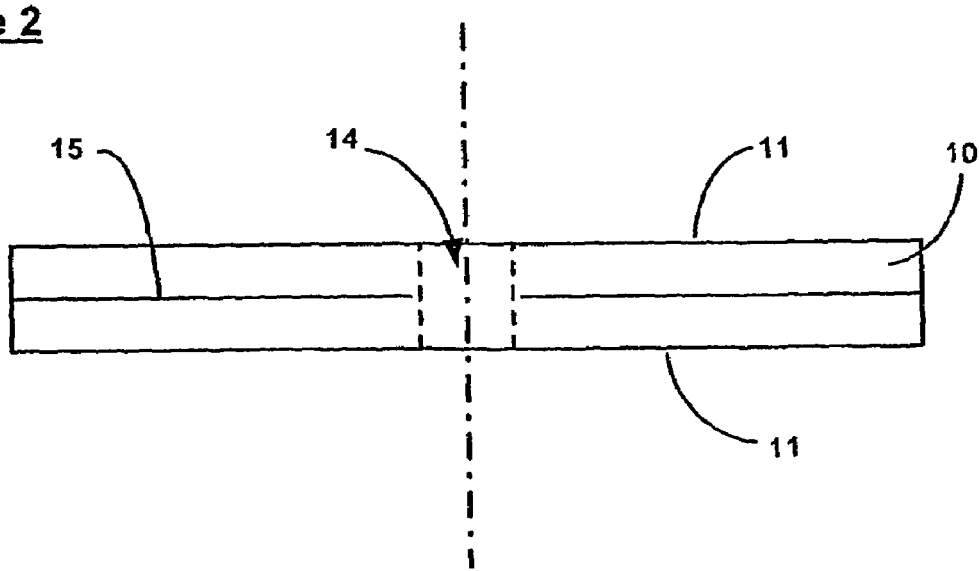
FIG. 2 is a diagrammatic vertical section through the sensor.

The layered structure is subjected to a sintering process in an oven, optionally with applied pressure, for a pre-determined time. This firing process produces a sintered ceramic base structure 10 with an embedded internal electrode 15 equidistant from the two end faces of the structure, as shown in FIG. 2. The firing process reduces the overall thickness of the structure and so it is most important that the multiple layers of PZT composition are built up to a greater dimension than that required for the thickness of the final finished base structure.

Following sintering, both faces 11 of the fired material are ground, lapped and polished to a very high degree of flatness, typically of approximately Ra 0.05 µm. Further, the two faces are finished to be parallel to within 0.0071 µm across the structure, and with the internal electrode 15 remaining at the mid-thickness of the structure, to within a tolerance of 5 µm.

The overall shape of the base structure is then machined, by punching or milling and the central hole 14 is accurately positioned to extend centrally through the structure. Care must be taken to avoid chipping of the edges of the structure and the inner and outer diameters should be concentric to within 5 µm. As completed, the base structure is in the form of an annular disc with an internal electrode 15 parallel to the outer faces 11 of the disc.

The electrode structures 12,13 are then formed on the faces of the disc, using manufacturing techniques developed for integrated circuits. The polished disc faces are cleaned so as to be free from all contaminants and then gold is deposited on those faces by means of sputtering or evaporation techniques. A mask of the desired electrode pattern is used to permit the etching of the deposited gold using photolithographic processes as are widely employed in the integrated circuit industry, so leaving the required electrode structure on the faces of the disc, as well as conducting tracks from the individual electrodes into the central hole 14. In this way the overlying electrodes on the two faces of the disc are connected together.

The electrode structures on the two faces of the disc should be identical and aligned to within 5 minutes of arc. It has been found that only be having such high degrees of accuracy can reliable and consistent results be achieved, for the mass-production of rate sensors in accordance with this invention.

The ceramic material must be polarised, and though this could be performed before the production of the electrode structures, it preferably is performed after the electrode structures have been fabricated. This is achieved by applying a voltage across the earth electrodes 13 and sectored electrodes 12. The polarisation process is crucial for the proper operation of the rate sensor and depends upon the design of the sectored electrodes 12 and earth electrodes 13 on the faces 11 being greater than the distance between the electrodes 12,13 on the disc faces and the common internal electrode. For example, where the finished disc is 400 µm thick, the gap must be at least 200 µm.

The final stage of the sensor production is the interconnection of the earth electrodes 13 to the internal electrode 15. This is achieved by coating the outer edge of the disc with a paint material containing conductive gold.

Figure 3:
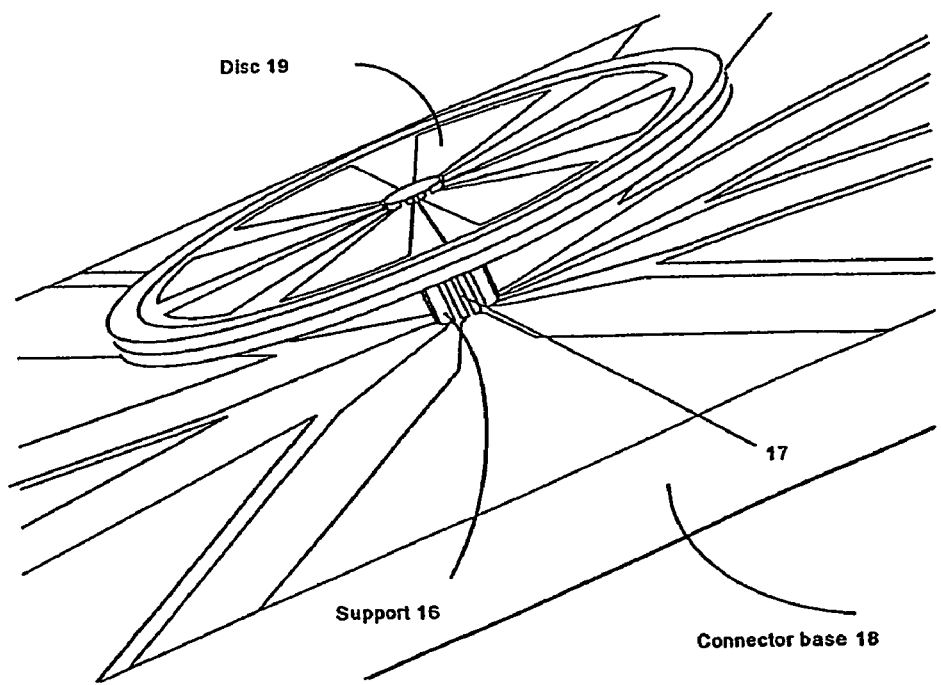
FIG. 3 illustrates the sensor mounted, ready for use.

The finished disc 19 is mounted on a support peg 16 upstanding from a connector base, as shown in FIG. 3, such that there is clearance between the disc and the upper surface of that base, to permit the disc freely to resonate. Conducting tracks 17 extend along the upper surface of the connector base 18 and along the peg 16, so as to connect to the electrodes of the disc through the tracks formed thereon and in the walls of its hole 14. Again, conventional integrated circuit techniques may be employed for the mounting of the disc on the peg and effecting the connections between the respective tracks, and also for making external connections to the tracks on the connector base 18. Finally, the assembly may be encapsulated, again using conventional techniques with the connections to the tracks on the connector base being led out of the package.

Figure 4:
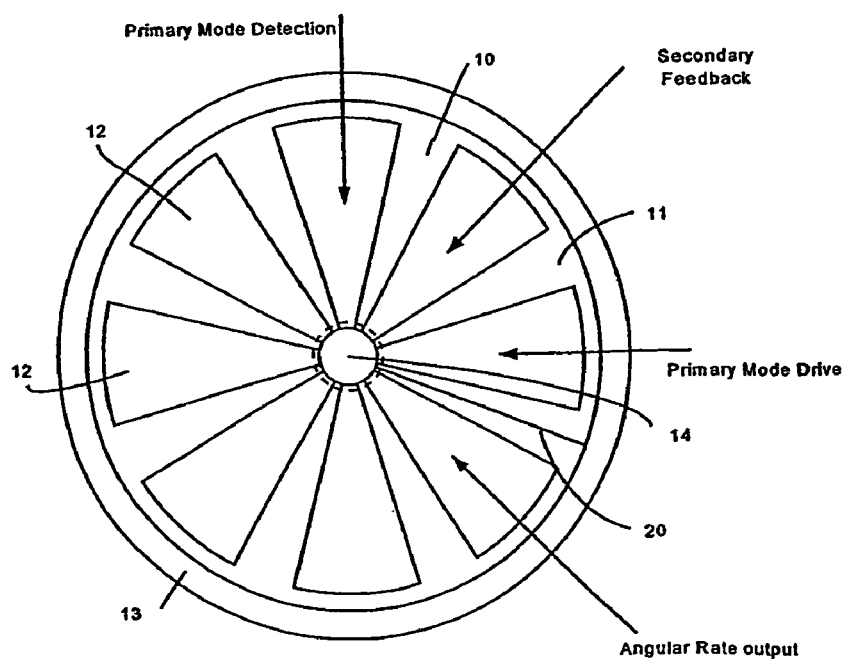
FIG. 4 diagrammatically illustrates a modified electrode design.
Figure 5:
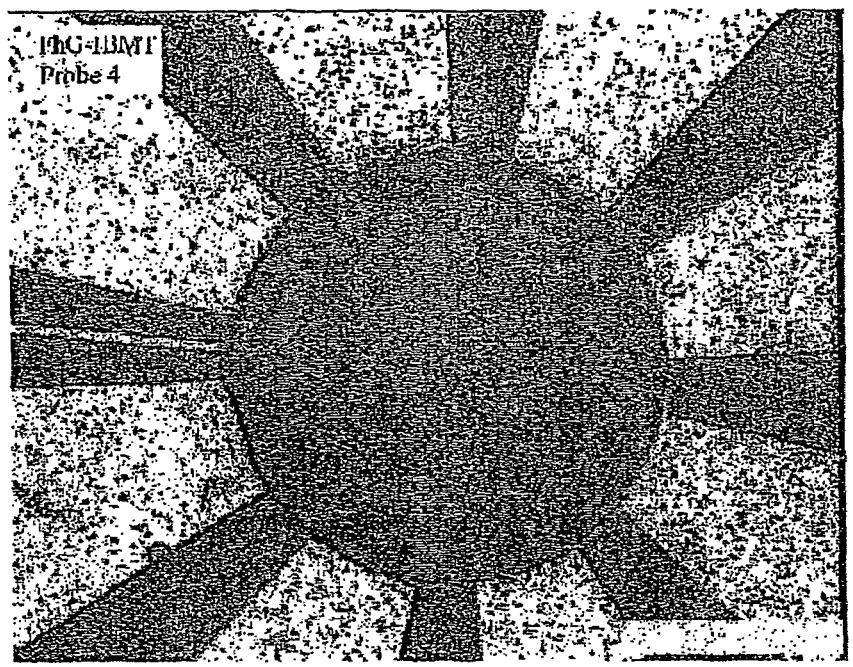
FIG. 5 is a photomicrograph of the modified electrode design.

Referring now to FIG. 4, for certain applications it may be advantageous to provide an earth track 20 extending between an encircling earth electrode 13 and the central hole 14, for connection through that hole to the internal electrode 15. The earth track 20 and adjacent sector electrodes 12 should be such that the earth track does not interact with the adjacent electrodes, so that the earth track does not significantly affect the electric field within the piezo-electric material. This is achieved by ensuring that at no point is the distance between the earth track and adjacent electrodes less than the distance between the central electrode and the earth track. FIG. 5 is a photomicrograph showing the earth track, in the central region of the disc.

A brief description of the use of the sensor as described above will now be given.

Figure 6:
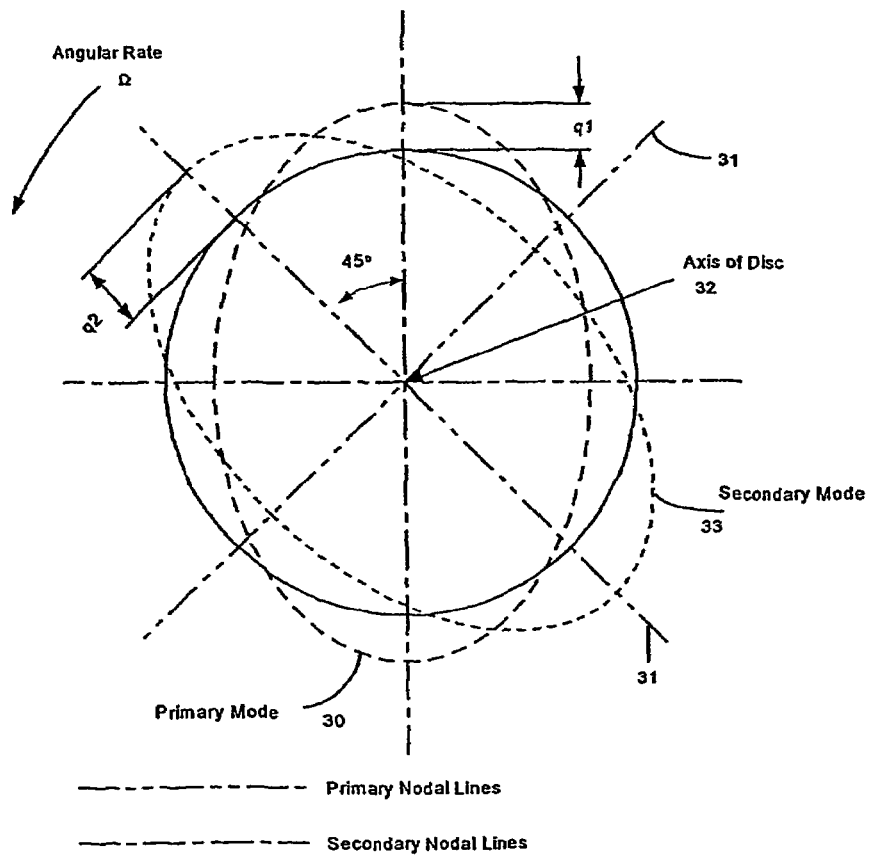
FIG. 6 illustrates the operation of the sensor.

FIG. 6 shows the displacement of the primary mode 30 of vibration of a symmetric disc, of the same general form as disc 19 described above. This has an amplitude in the plane of the disc of $q_1$ and a resonant frequency of $w_1$. The two nodal lines 31 are at 45° to the x and y axes—the nodal lines 34. When an angular rate $\Omega$ is applied about the axis 32 of the disc, Coriolis forces generate energy in the secondary mode which is orthogonal to the primary mode. The displacement in the plane of the disc for the secondary mode 33 has an amplitude of $q_2$ and the nodal lines 34 are at 45° to the primary mode. $q_2$ is proportional to the angular rate $\Omega$.

Figure 7:
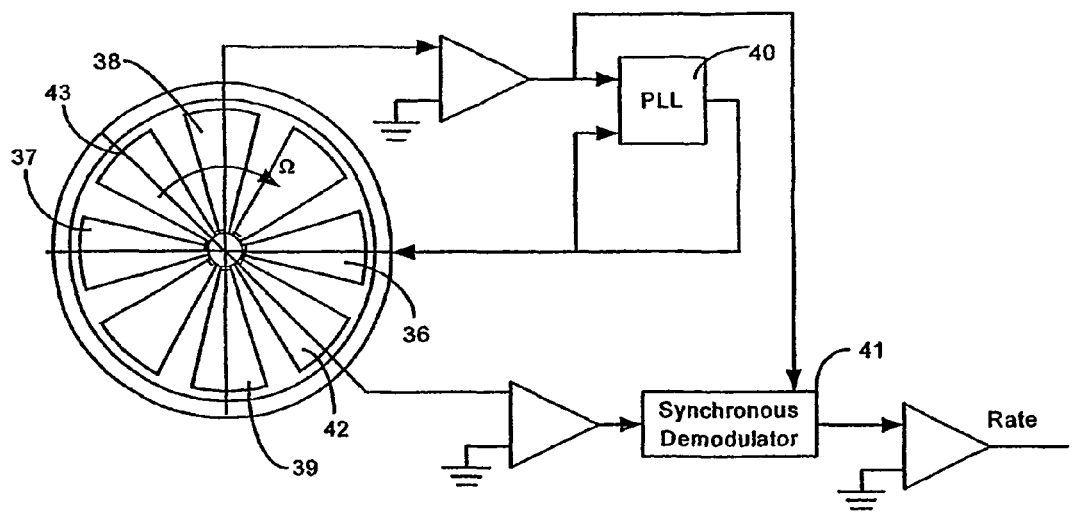
FIGS. 7 and 8 respectively show open-loop and closed-loop control circuits in association with the sensor.

FIG. 7 shows an example of use of the disc in an open loop configuration, to detect angular rate $\Omega$ about its axis. In this example two electrodes 36,37 are used to drive the disc into resonance at $w_1$. These are diametrically opposite so are driven in phase. Two other opposed electrodes 38,39 are used to detect the primary mode and maintain it on resonance $w_1$. This is achieved in this example using a phase lock loop device (PLL) 40. The rate is detected by monitoring the output from electrodes. In this example the output signal is passed through a synchronous demodulator 41 which is also connected to the secondary pickoff electrodes 42,43.

The above-described sensor disc 19 uses six electrodes, but other configurations are possible. The minimum number of electrodes would be one for the primary signal and one for the secondary signal. Whilst this would produce a working device there are drawbacks because it would be difficult to control the primary mode and the output signal would not be optimised. Realistically, the minimum number of electrodes that could be used is three, one to drive the primary mode, one to detect the primary mode and one to detect the secondary mode.

Figure 8:
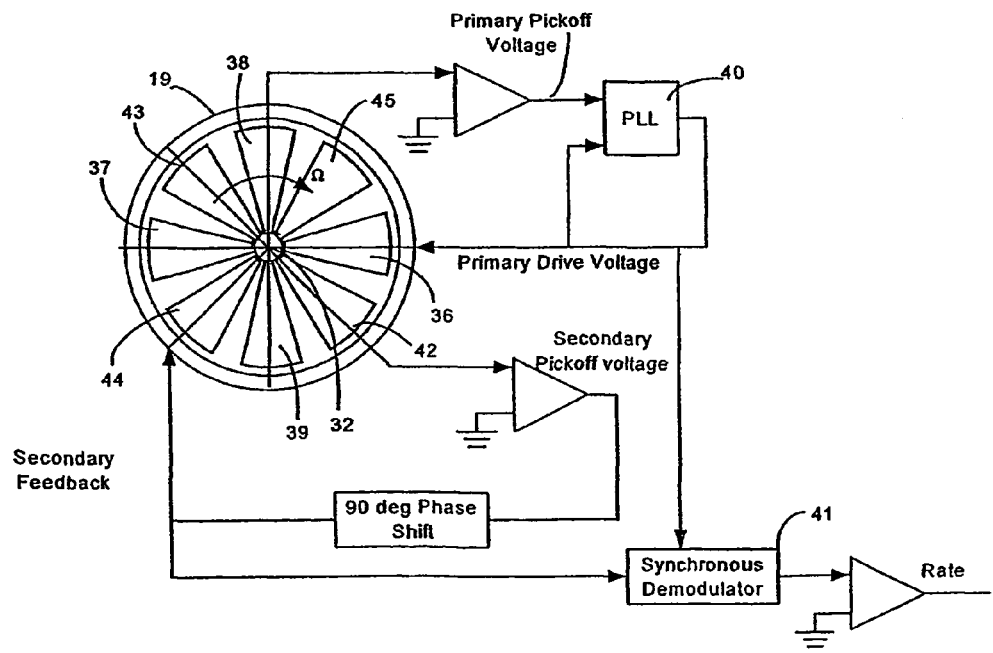

FIG. 8 shows an example where the disc 19 is used in a closed loop configuration to detect angular rate Ω about axis 32. In this example the primary drive and feedback control is the same as described for FIG. 7. Electrodes 36,37 are used to excite the primary mode at $w_1$ and electrodes 38,39 are used in the feedback control. Two rate detection electrodes 42,43 are used to detect the rate signal. This signal is then phase shifted by 90° and fed back to electrodes 44,45 in order to null the secondary mode. The amplitude of this secondary feedback signal is then passed through the synchronous demodulator 41.

In this example eight electrodes are used in a symmetrical configuration. However fewer electrodes could be used. Realistically a minimum of two electrodes would be used to drive and detect the primary mode and two electrodes to detect and null the secondary mode.

Figure 9:
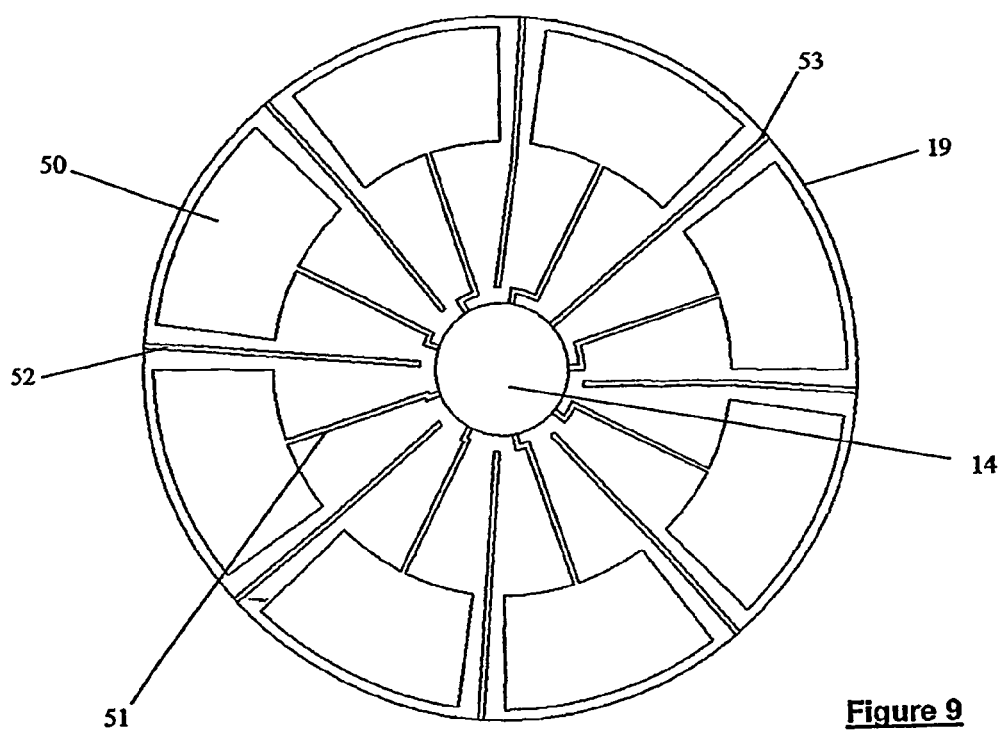
FIG. 9 shows a further embodiment of FIG. 4.

FIG. 9 shows an alternative electrode array to that shown in FIG. 4. In the array of FIG. 9, the electrode structure is made up of individual electrodes each shaped as a sector of an annulus extending round the outer portion of the disc 19. Each electrode 50 is connected to the central hole 14 of the disc 19 by a respective conductor 51, and an earth conductor 52 runs between each pair of electrodes from the outer rim of the disc 19 to a position adjacent the central hole 14, except for one such earth electrode 53 which connects to the support (not shown) on which the disc is mounted. To accommodate nine equi-spaced connections within the cylindrical wall of the central hole 14, the eight conductors 51 from the electrodes 50 are stepped as shown adjacent the hole 14. In this example, the electrical coupling to the ceramic material of the disc is increased on account of the optimised strain distribution resulting from the mode shape of the electrodes as compared to the array of FIG. 4, resulting in an increased output signal for a given input signal.

The invention claimed is:

1. A method of fabricating a solid state angular rate sensor, comprising:

preparing a generally circular base assembly by fabricating first and second outer layers of a piezo-electric ceramic material each built up from multiple layers of a ceramic sheet or film capable of being tape-cast and sintered, and providing between said outer layers an inner layer of a metallic material, sintering the prepared base assembly thereby to produce a piezo-electric base structure having an inner electrode between the sintered outer layers;

shaping the sintered base structure to be disc-shaped with a circular cross-section and an outer periphery;

providing on the outer faces of the outer layers respective first and second electrode structures, each such electrode structure comprising a plurality of independent separate sectors each having a radial extent, the first and second electrode structures being of the same configuration and arrangement and having their respective sectors in close alignment with each other; and providing means effecting connections to at least some of the sectors on the outer faces of the outer layers and to the inner electrode whereby the sectors may be separately driven with a signal which causes the disc to resonate in an in-plane mode.

2. A method as claimed in claim 1, wherein the metallic material used to form the inner layer is a sinterable metal which when sintered forms the internal electrode.

3. A method of fabricating a solid state angular rate sensor, comprising:

preparing a generally circular base assembly by fabricating first and second outer layers of a piezo-electric ceramic material each built up from multiple layers of a ceramic sheet or film capable of being tape-cast and sintered, and providing between said outer layers an inner layer of a metallic material, sintering the prepared base assembly thereby to produce a piezo-electric base structure having an inner electrode between the sintered outer layers;

shaping the sintered base structure to be disc-shaped with a circular cross-section and an outer periphery;

providing on the outer faces of the outer layers respective first and second electrode structures, each such electrode structure comprising a plurality of independent separate sectors each having a radial extent, the first and second electrode structures being of the same configuration and arrangement and having their respective sectors in close alignment with each other;

providing means effecting connections to at least some of the sectors on the outer faces of the outer layers and to the inner electrode whereby the sectors may be separately driven with a signal which causes the disc to resonate in an in-plane mode; and providing respective earth electrodes encircling the respective electrode structures on said outer faces.

4. A method as claimed in claim 3, wherein the encircling earth electrodes are formed to extend radially inwardly from the outer periphery of the base structure.

5. A method as claimed in claim 4, wherein the encircling earth electrodes and said metallic inner electrode are interconnected.

6. A method as claimed in claim 5, and wherein a central hole is formed through the base structure concentric with the outer periphery thereof, a first earth track being provided to interconnect the encircling earth electrode on the first outer layer and the inner electrode, which first earth track has a radial part which extends radially between a pair of adjacent sectors of the external electrode structure on the first outer layer from the earth electrode to the central hole, and a further part which extends through the central hole to the internal electrode.

7. A method as claimed in claim 6, wherein a second earth track is provided to interconnect the encircling earth electrode on the second outer layer and the inner electrode, which second earth track has a radial part which extends radially between a pair of adjacent sectors of the external electrode structure on the second outer layer from the earth electrode to the central hole, and a second part which extends through the central hole to the internal electrode.

8. A method as claimed in claim 7, wherein the radial parts of first and second earth tracks are arranged in alignment with each other, on opposed outer faces of the base structure.

9. A method as claimed in claim 5, wherein a conducting coating is applied to the outer periphery of the base structure to interconnect the encircling earth electrodes and the inner electrode.

10. A method as claimed in claim 9, wherein the applied conducting coating is a gold-based paint preparation.

11. A method as claimed in claim 3, wherein each sector of the electrode structure is formed to be substantially in the shape of a sector of a circle, extending from the central region of the base structure outwardly towards the outer periphery of the base structure.

12. A method as claimed in claim 3, wherein each sector of the electrode structure is formed to be in the shape of a sector of an annulus, the outer arc of which is at or adjacent to the outer periphery of the base structure.

13. A method as claimed in claim 3, wherein a central hole is formed through the base structure, concentric with the outer periphery thereof.

14. A method as claimed in claim 3, wherein following the sintering of the base structure, the faces of the structure are ground, lapped and polished.

15. A method as claimed in claim 3, wherein the electrode structures are formed by applying to each outer face of the base structure a continuous metallic coating, and then the required electrode structures are formed by a photo-lithographic micro-etching technique.

16. A method as claimed in claim 15, wherein a metallic layer is deposited on the base structure faces by one of metal-sputtering or metal-vapour-deposition.

17. A method as claimed in claim 3, wherein the ceramic material is polarised by impressing a voltage across the earth electrodes and the electrode structures.

18. A method as claimed in claim 3, wherein the first and second layers of piezo-electric ceramic material are built up by overlaying successive strips of the material provided in a sinterable tape-like form.

* * * * *